(12) United States Patent
Jacobson (10) Patent No.: US 6,454,218 B1
(45) Date of Patent: Sep. 24, 2002

(54) INTEGRATED SYSTEM FOR PROVIDING 3-AXIS ATTITUDE-CONTROL, ENERGY-STORAGE, AND ELECTRICAL POWER

(75) Inventor: Michael Dean Jacobson, Ridgecrest, CA (US)

(73) Assignee: Quoin International, Inc., Ridgecrest, CA (US)

( * ) Notice: Subject to any disclaimer, the term of this patent is extended or adjusted under 35 U.S.C. 154(b) by 26 days.

(21) Appl. No.: 09/797,241

(22) Filed: Feb. 27, 2001

Related U.S. Application Data (60) Provisional application No. 60/185,539, filed on Feb. 28, 2000.

(51) Int. Cl.[7] ................................................. B64G 1/28
(52) U.S. Cl. ........................................ 244/165; 244/164
(58) Field of Search ...................... 244/165, 79; 701/3, 701/4, 13; 318/584, 648, 649

(56) References Cited

U.S. PATENT DOCUMENTS

| | | | |
|---|---|---|---|
| 2,183,314 A | * | 12/1939 | Goddard |
| 2,822,755 A | * | 2/1958 | Edwards et al. |
| 2,945,643 A | * | 7/1960 | Slater |
| 3,476,129 A | * | 11/1969 | Halstenberg |
| 3,741,500 A | * | 6/1973 | Liden |
| 5,692,707 A | * | 12/1997 | Smay |
| 6,113,033 A | * | 9/2000 | Parks et al. |
| 6,305,647 B1 | * | 10/2001 | Defendini et al. |

* cited by examiner

*Primary Examiner*—Charles T. Jordan
*Assistant Examiner*—T. Dinh
(74) *Attorney, Agent, or Firm*—Kenneth G. Pritchard (57) ABSTRACT

An integrated system for providing 3-axis attitude-control, energy-storage, and electrical power in which two counter-rotating inertia-wheels are tandem mounted with rotational axis oriented on and parallel to the longitudinal-axis of an airframe. A horizontal- and vertical-translating support is centrally-located between the wheels and houses a common wheel-bearing mount communicating with and supporting both inward-pointing inertia-wheel shafts. The preferred embodiment further consists of two outwardly-mounted tilt wheel bearing and suspension means, each communicating with and supporting an inertia-wheel outward-pointing shaft. Taken together, these supports and their associated two-axis actuator enable both wheels to be tilted equally in opposite directions to generate a combination of pitch and yaw reaction torque. Further, an electric generator integrally mounted to each inertia-wheel, and an electric load controller connected to each electric generator enable the creation of reaction roll torque. The preferred embodiment further comprises a turbine interface integrally attached to each inertia-wheel, a turbine nozzle associated with each wheel, and a dual gas-generator interface with a gas-generator controller enabling on-demand power input to the energy-storage system. An autopilot and sensor system are used to provide command signals that are processed and converted by this assembly into 3-axis reaction torque that controls the flight direction and orientation of the airframe.

19 Claims, 5 Drawing Sheets

INTEGRATED SYSTEM FOR PROVIDING 3-AXIS ATTITUDE-CONTROL, ENERGY-STORAGE, AND ELECTRICAL POWER

This application claims the benefit of provisional application No. 60/185,539 filed Feb. 28, 2000.

BACKGROUND OF THE INVENTION

This invention relates generally to the field of flight-control systems, and more particularly to an integrated system for providing 3-axis attitude-control in addition to providing energy-storage and thereby the ability to generate power to supply actuation and flight control system components with electrical energy.

Systems based on flywheel technology to store energy and supply electrical power are well-known in the prior art. These are known for their reliability and high power density. For these reasons systems based on flyweel technology were added to spacecraft to perform both energy-storage and power-supply functions. In addition, to economize on space and weight, these systems were also designed to generate torque along preferred axes to control, for example, satellite orientation in space. As recognized to those schooled in the art, such systems would use momentum-wheel or tilt-wheel techniques to enable system offers passive roll damping with no active control and the transverse-oriented gimbal-mounted tilt-wheel package does not lend itself to use in systems in which tight packaging volume is a high priority. Finally, both systems offer no advantage for use in long-uration missions.

SUMMARY OF THE INVENTION

The primary object of the present invention is a tandem-mounted dual inertia-wheel set with a two-way tilt mechanism enabling one compact assembly to generate precise and smooth 3-axis reaction torque (attitude) control for small airframes and to provide useful operation over very long-uration flights.

Another object of the invention is the integration of the dual tilt wheel mechanism to generate pitch and yaw torque and the dual momentum wheel system to generate roll torque that when combined together enable complete 3-axis active attitude-control.

Another object of the invention is an integrated two-way tilt actuator and stiff center suspension enabling autopilot-controlled combined pitch & yaw reaction torque control.

In a further object of the invention, a dual-mode electric load controller enables the generation of bi-directional roll torque for flight control.

In yet another object of the invention, a dual tandem wheel mount approach enables compact packaging with minimal wasted space.

In still another object of the invention the use of dual inertia-wheels enables a large amount of energy-storage.

In another object of the invention a dual turbine and gas-generator interface enables on-demand (including during mission execution), rapid-response charging and high power input to the energy-storage system enabling use of this system for very long-duration missions.

In another object of the invention, dual electric generators provide a large amount of electrical power output to support diverse system requirements.

In a further object of the invention, an electric motor interface and gas flow input means enable repeatable and verifiable system performance readiness checks.

Finally, another object of the invention is a durable mechanical design featuring long shelf life.

Other objects and advantages of the present invention will become apparent from the following descriptions, taken in connection with the accompanying drawings, wherein, by way of illustration and example, an embodiment of the present invention is disclosed.

An integrated system for providing active 3-axis attitude-control, energy-storage, and electrical power is described. The system comprises two counter-rotating inertia-wheels tandem mounted with rotational axis oriented parallel to and on the longitudinal-axis of an airframe; a horizontal- and vertical-actuated support centrally located between the wheels housing wheel bearings communicating with and supporting the respective inward-pointing inertia-wheel shafts; two outboard-mounted tilt wheel suspensions and bearings, each communicating with and supporting one inertia-wheel outward-pointing shaft; an electric motor-generator integrally mounted to each inertia-wheel; and an electric load controller connected to each electric motor-generator. This system provides 3-axis reaction torque control using a combination of momentum-wheel method to generate roll-torque and tilt-wheel method to generate pitch and yaw torque. Electrical load management provides roll torque modulation and an actuated wheel tilt means provides pitch and yaw torque modulation. A dual turbine interface and gas-generator system provides rapid-response on-demand input to the inertia-wheel energy-storage system; enabling the system to be recharged and to function usefully in very long-duration missions. Finally, a further novelty of this system is in integrating 3-axis attitude-control, energy-storage, and power-supply functions within a compact space-saving package.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
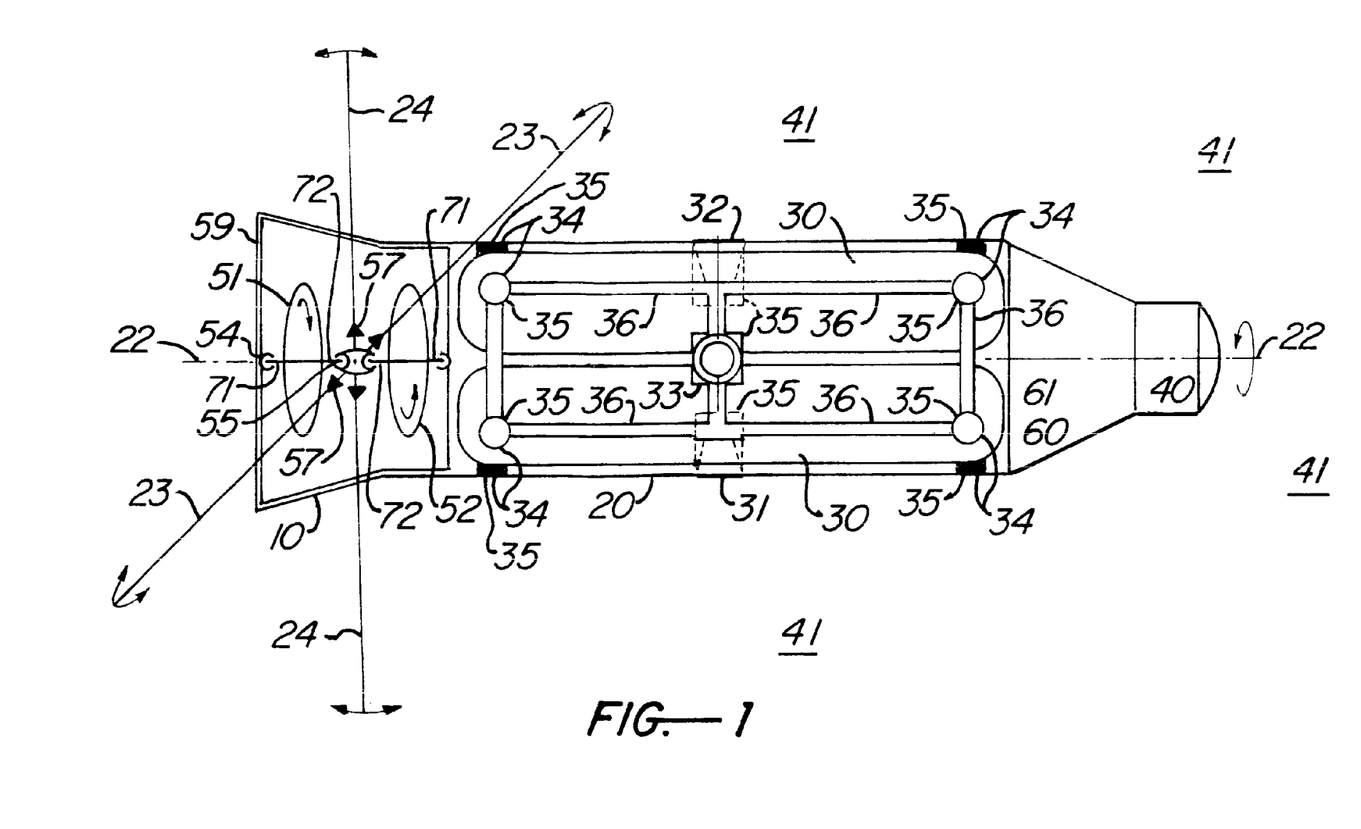
FIG. 1 is a view of the invention used in a typical flight vehicle application.

In accordance with the present invention, FIG. 1 shows an overview of the attitude-control and power-management system (hereafter referred to as "the system") 10 mounted in a typical airframe 20 of a missile. It will be noted in this preferred embodiment that the system 10 is located at the aft of airframe 20 to facilitate generating reaction torque on airframe 20 and to eliminate as far as practical balance-derived performance degradations that would introduce cross-talk or low-level "continuous-offset" torque that could reduce or impair the level of torque deliverable to airframe 20. In this preferred embodiment the system 10 is located at the aft end and is responsible for generating torque on the airframe 20 in three axis directions clearly marked in the figure as roll axis 22, pitch axis 23, and yaw axis 24.

It is further noted in this preferred embodiment that between the system 10 and seeker 40 and autopilot 60 is mounted a multiplicity of hot-gas generators 30 that are typically used to develop side thrust at nozzles 31, 32, 33. In regard to this application, the system 10 is advantageously applied to develop 3-axis attitude-control torque which use eliminates the need for a multiplicity of additional nozzles 34 and valves 35 and hot-gas flow-management conduits 36 (shown here for illustration purposes) that would otherwise be required to generate attitude-control torque. By virtue of this beneficial use of the system 10 the overall airframe assembly 20 is simplified and the overall airframe assembly cost is reduced.

It will be further noted that seeker 40 depends upon the three-axis torque-generation function of the system 10 to provide changes in airframe 20 orientation-attitude in space to enable the seeker 40 to maneuver and to expand the field of view of said seeker 40, thereby facilitating a search for targets. A further advantage afforded by use of the system 10 is to generate power to supply seeker 40 and other subsystems (such as valves 35, actuators 57, autopilot 60, etc.) with appropriate electrical power, voltages, and currents to enable their use. Still a further advantage of using the system 10 is to reduce the need to use hot-gas generator 30 thrust nozzles 34, as discussed previously for attitude-control, which in turn reduces the presence of an undesirable gas cloud 41 around said airframe 20, which cloud 41 tends to reduce the effectiveness of seeker 40 to discriminate targets against background noise. This being because the presence of cloud 41 increases the level of background thermal radiation noise that the seeker 40 must look through.

Finally, FIG. 1 shows the general orientation and relative axially-arranged position of inertia-wheels 51 and 52 with respect to the longitudinal roll axis 22 of airframe 20 and the transverse pitch axis 23 and the transverse yaw axis 24 of airframe 20. Also note the arrows drawn along axis 23 and axis 24. These translation-direction indicators are associated with the inertia-wheel center moving mount 53 to illustrate the two directions of translation of the inertia-wheel center moving mount 53 caused by actuator means 57. For this and later descriptions, these directions will be designated as the horizontal direction (for translation along pitch axis 23) and the vertical direction (for translation along yaw axis 24). It will be further noted that the spin directions of said wheels 51 and 52 are marked as CW and CCW with arrows to indicate a typical arrangement for proper application of the system 10 to accomplish all the desired functions of the invention (energy-storage, power-supply, creation of 3-axis reaction torque).

Certain control, power, mounting and suspension components are also indicated here to demonstrate the relative position of each with respect to the rest of the system 10. These will be further described in more detail in the later figures. These include the dual tandem-mounted flywheel system housing 59, the outward-pointing flywheel shafts 71, the inward-pointing flywheel shafts 72, the outer flywheel shaft support means 54, the inward-pointing shafts support bearings 55, the tri-axial motion sensor means 61, and two motor-generators 70.

Figure 2:
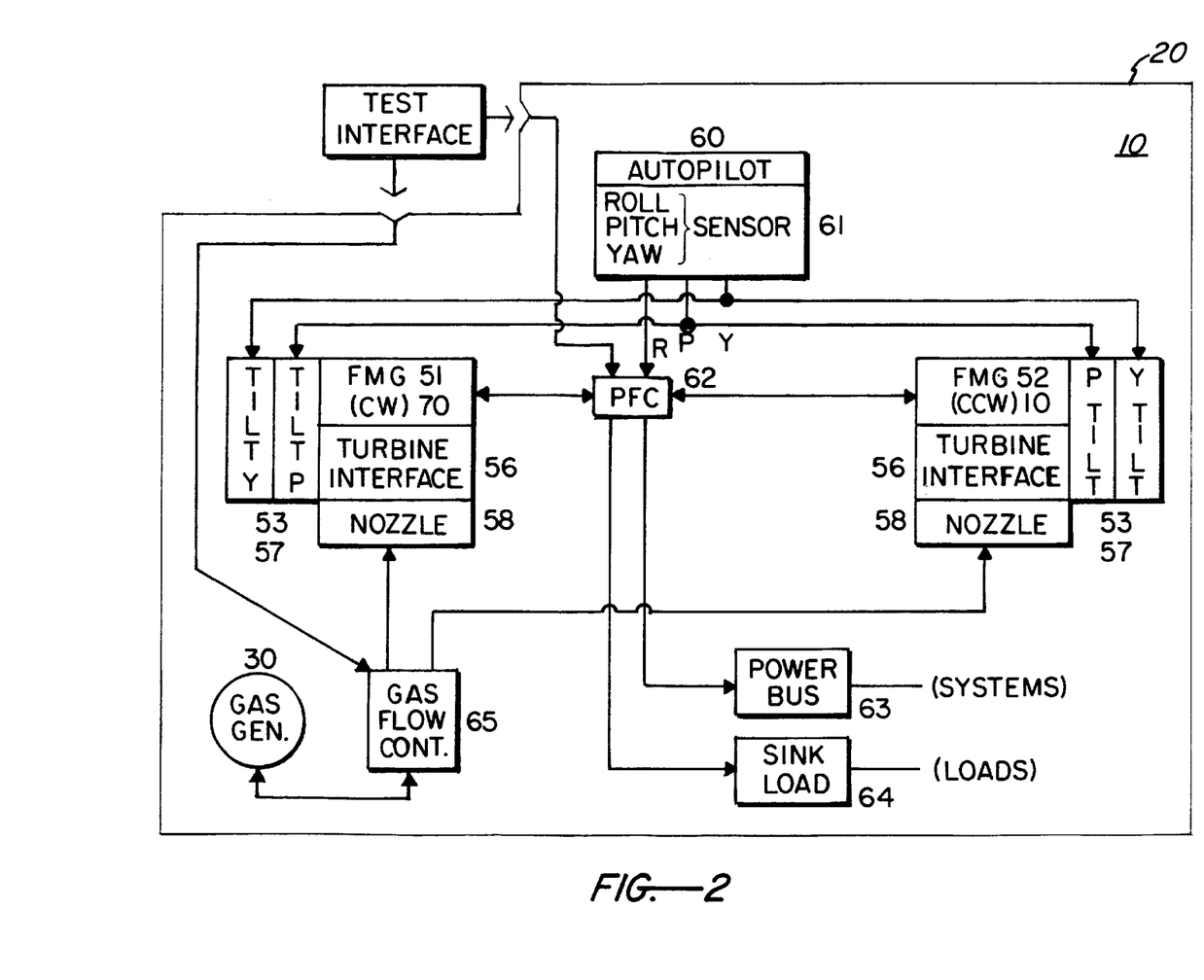
FIG. 2 presents a schematic block diagram of the system.

In accordance with the present invention, FIG. 2 shows a system block diagram of the preferred embodiment. In this illustration the boundary 20 represents the airframe and the blocks inside represent functional components that make up the system 10. The control-related components include the autopilot 60, roll, pitch, yaw sensor means 61, the power flow controller 62, the power bus 63, the sink loads 64, the gas flow controller 65 and the external test interface 66.

The autopilot 60 consists of a navigation computer and associated sensor means 61 which coordinate functions to generate commanded attitudes and feed these to the system 10 control interfaces. Commanded pitch and yaw orientations are translated into actuator set-points in either analog or digital format. These commands are fed to the two-way tilt P and tilt Y actuator 57 which in turn causes a translational motion of moving mount 53 in either the horizontal (along pitch axis 23) or the vertical (along yaw axis 24) directions to tilt both inertia-wheels 51 and 52, simultaneously and by equal and opposite angular amounts. This tilt action causes reaction torque along an axis perpendicular to the plane of the tilt and in the pitch direction, the yaw direction, or along a combined pitch-yaw direction according to and in response to the direction of tilt imposed on the inertia-wheels by two-way actuator 57. The strength of reaction torque generated (by tilt-wheel precession) is determined by the rate of tilt action imposed on each wheel as well as the angular momentum stored in each inertia-wheel. The angular momentum stored in each inertia-wheel is a function of the wheel design (the mass moment of inertia which is determined by wheel shape and the material used for fabrication) as well as the rotational spin rate of the wheel.

Roll reaction torque are generated by the system 10 when the autopilot 60 senses roll motion signals from sensor 61. The autopilot 60 converts roll motion signals into roll torque commands that are fed to the power flow controller 62. Power flow controller 62 converts roll commands into power flow-management signals that adjust the electrical load seen by both flywheel motor-generators 70 of wheels 51 and 52. The electrical loads consist of the power bus 63, the sink load 64, and the motor associated with each flywheel motor-generator 70 of wheel 51 and 52. Power transfer is controlled by the power flow controller 62 to generate roll reaction torque in accordance with the command obtained from the roll-axis output of autopilot 60. The means to accomplish these actions is known in the art as the momentum-wheel method because each flywheel 51,52 which serves as a mount for each motor-generator 70 is accelerated or decelerated to generate torque in the desired direction. In typical operation a small externally imposed roll motion (perturbation) would be opposed by reaction torque generated by the net balance of electrical loads seen by both flywheel motor-generators 70 of wheels 51 and 52. The net balance of electrical load could come from a variety of load combinations including:

1.) Power generated by flywheel motor-generator 70 of wheel 51 is fed across to flywheel motor-generator 70 of wheel 52. In this case flywheel 51 decelerates (by acting as an electric power generator) and flywheel 52 accelerates (by acting as an electric motor load). Both wheels generate acceleration-imposed reaction torque. Both torque add together to act as the roll reaction torque output of the system 10. These torque are additive because both flywheels are spinning in opposite directions and in this case one wheel decelerates while the other wheel accelerates. This scenario can be reversed to generate roll reaction torque in the opposite direction. The outcome of these roll-reaction responses generated by the system 10 is to create roll-damping or roll position control. Roll damping motion is generally oscillatory so that in a typical situation reaction roll torque will be provided first in one direction, then in the opposite direction, followed by the reverse direction, etc. In each "cycle" the reaction torque needed will be diminished as the damping action takes effect. The system 10 is an ideal means to accomplish these actions since power can be transferred from one wheel to the other for as long as needed to create the roll damping torque. The limiting factor in this case is the level of torque required. This sequence of actions will produce limited torque amplitude because the electrical power flow from one wheel to the other is limited by the combination of generator 70 internal impedance and the resistive load caused by the motoring action 70 of the opposite wheel which acts as a load on the electric generator 70.

2.) Power is dissipated to the power bus 63 in response to torque demands on the system 10. In this case the characteristic load imposed on the power bus 63 by components of the complete assembly (seeker 40, actuators 57, valves 35, autopilot 60, etc) is exploited to simply dissipate power from one flywheel motor-generator 70 or the other. The power flow controller 62 is given commands from the autopilot 60 which in turn determine which flywheel motor-generator 70 is called upon to supply power to the power bus 63. The power flow controller 62 places the power bus 63 load onto the generator output of either flywheel motor-generator 70 of wheel 51 or flywheel motor-generator 70 of wheel 52. If no roll reaction torque output (also known as balanced roll torque output) is desired, the power flow controller 62 divides the power bus 63 load equally between both flywheel motor-generator 70 of wheel 51 and flywheel motor-generator 70 of wheel 52 such that both flywheels decelerate equally and oppositely at the same rate.

3.) If greater roll torque output is desired, the power flow controller may route power to the sink load means 64 from either flywheel motor-generator 70 of wheel 51 or flywheel motor-generator 70 of wheel 52. Sink load 64 is simply a variable low-resistance energy sink capable of dissipating a large but limited amount of power (to prevent damaging the electric motor-generators 70.) This power sink would be called upon in concert with the two power extraction methods described above to adjust the level of power drawn from both flywheel motor-generators 70 as needed to maintain a required level of roll reaction torque output by the system 10.

Operation of the system 10 requires that a pre-determined level of mechanical energy be stored into both flywheels 51 and 52 before being called upon to perform the functions of 3-axis reaction torque generation and power generation. Both flywheels 51 and 52 are fitted with a multiple turbine-blade set 56 that enables the transfer of energy into the system 10. Each turbine blade set 56 accepts the flow of gas from the gas-generator 30 through the gas flow control means 65 and nozzle 58. This gas flow provides a large flow of energy input (providing an energy charge function) to each flywheel 51, 52 which spins up each flywheel rapidly and as needed (on-demand) either before booster separation through the test interface 66 and gas flow controller 65 or after booster separation using the gas-generator system 30 during the execution of the mission. The ability to charge the system 10 with energy during the execution of the flyout mission (using the gas-generator system 30, the turbine blade sets 56 and the nozzles 58) is an advantageous, important, and novel feature of the system 10 that enables a greater degree of system flexibility and enables the important and unique ability to support very long-duration missions.

The test interface 66 is an external component of the system 10 that is called upon from time to time to determine the state of readiness of the system 10 to accomplish the functions of three-axis reaction torque generation, energy-storage, and electric power generation. This interface may be located at a launch control site or within a portion of a booster that carries the airframe 20. In this instance the readiness of the system 10 may be verified before booster separation. A further function of the test interface 66 is to pre-load the system 10 with energy before stage separation or launch either through the power flow controller 62 by electrical means (motoring both flywheels) or through the gas flow control interface 65 by means of a flow of gas to the nozzles 58, and turbine blade sets 56.

Figure 3:
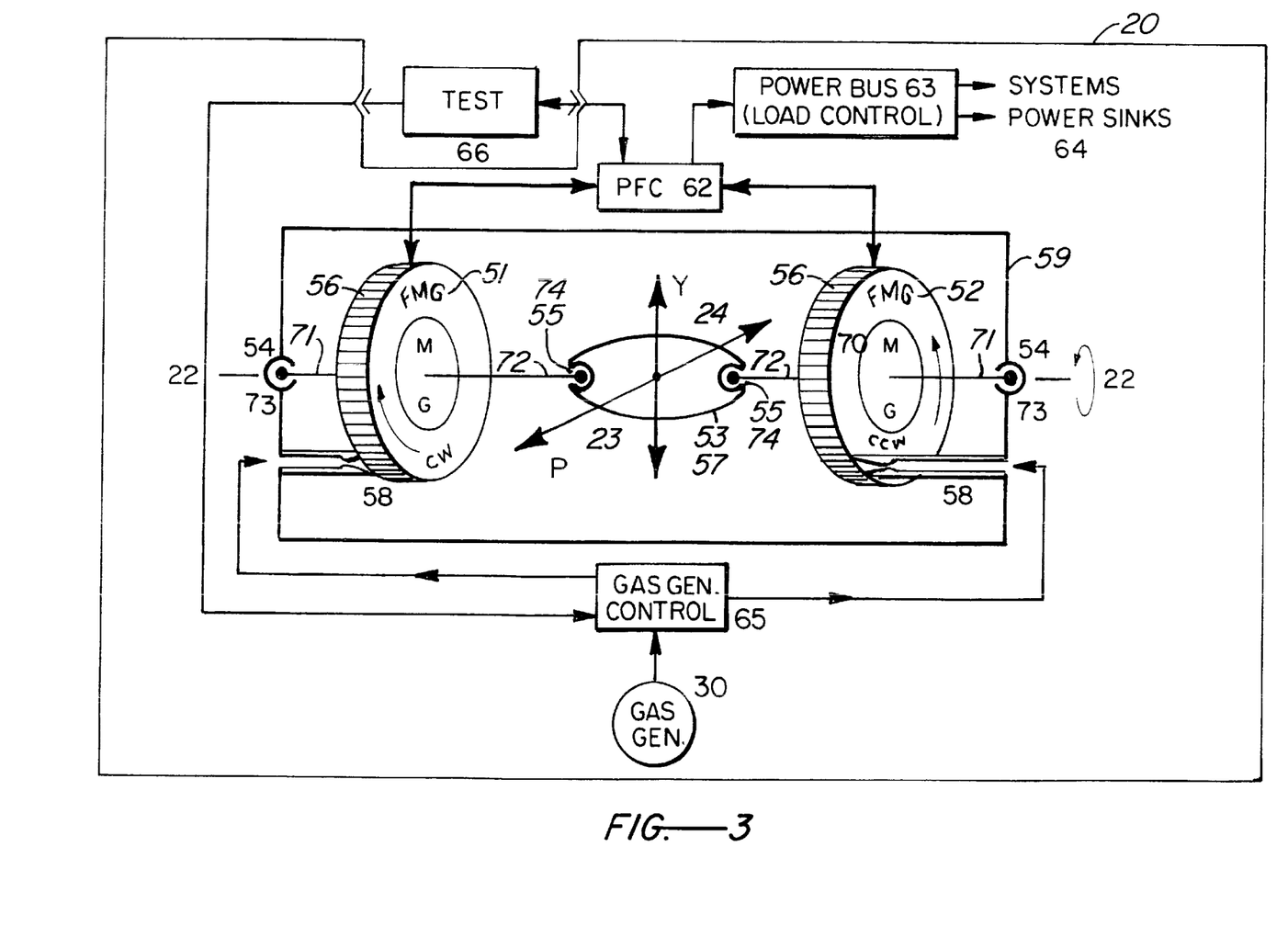
FIG. 3 is an exploded view of the invention.

In accordance with the present invention, FIG. 3 shows an exploded view of certain mechanical components that generate reaction torque and support energy input to the system 10.

The system 10 in this illustration is shown enclosed within airframe boundary 20. A further enclosure 59 houses certain mechanical components that produce reaction torque in the 3-axis directions; along roll axis 22, pitch axis 23, and yaw axis 24. Enclosure 59 is a mechanical support and compact housing shaped and designed to facilitate mounting flywheels 51, 52, the outward pointing flywheel shaft 71 support bearings 54, and the inward pointing flywheel shaft 72 support bearings 55 that are mounted within the 2-axis movable mount 53. To facilitate tilting both wheels 51, 52 the flywheel shaft support bearings 54 and 55 are fitted with ball-in-socket mounts (see also 73 in FIGS. 4 & 5) that enable free rotation of the bearing within the mount. These ball-in-socket mounts are commonly available from the bearing manufacturer. The tilt imposed on both flywheel 51 and 52 is a result of moving the center mount 53 along the horizontal direction (along pitch axis 23) or along the vertical direction (along yaw axis 24) or along a combined direction that involves both horizontal and vertical movement. When mount 53 is translated by 2-way actuator 57 the alignment of the flywheel spin axis (normally parallel to the roll axis 22) is shifted off by the angle of tilt. For this wheel rotation axis tilt to occur the wheel shaft bearing mounts at 54 and 55 must incorporate a mount rotation means 73 so that in each case the bearing rotation axis can follow the tilt of the wheel rotation axis. This is accomplished using a ball-in-socket spherical mount 73 and interface means to support each wheel shaft bearing 54 and 55 that acts as an interface between the fixed support frame of enclosure 59 and the inward pointing 72 and outward pointing 71 rotating shaft axis of each flywheel 51 and 52.

Each flywheel-motor-generator is rotated in opposite direction to the other such that in this case flywheel 51 rotates clockwise and flywheel 52 rotates counterclockwise. Each wheel is combined with a motor-generator 70 to facilitate testing via interface 66 or spinning the wheel up to speed (motoring to charge the wheel with energy via test interface 66 or to absorb power from the opposite wheel) and the generation of electric power to support the power-supply function of the wheel. Furthermore, each wheel is fitted with a set of turbine blades 56 that enable energy input by means of a nozzle 58, a gas-generator 30, and a gas flow-control system 65. The turbine blade sets 56 enable the system 10 inertia-wheels to receive a large input of energy in a short time when needed at the start of a mission and also during operation within the flyout mission; to enable long-duration mission support. In this case the turbine blade sets 56 and gas-generator 30, and nozzle 58 will operate together to spin each wheel 51, 52 up to the maximum specified rotational speed rapidly and at any point in time when a need for stored energy is sensed by the power flow control system 62 and gas-flow controller 65.

As discussed previously, roll reaction torque is obtained from the momentum-wheel effect by acceleration and deceleration of each flywheel 51, 52 in response to the actions of the power flow controller 62. The electrical load seen by each flywheel motor generator 70 of wheel 51, 52 is controlled on a continuous basis by the power flow controller 62. The amount of power drawn from each wheel is adjusted to control the deceleration rate and thereby the roll reaction torque generated by the wheel. The roll reaction torque acts around roll axis 22 and can be produced in opposite directions depending on which wheel the power flow controller 62 calls upon to supply electric power. The total electrical load seen by either flywheel motor-generator 70 of wheel 51, 52 is adjusted on a continuous basis by the power flow controller 62 to shift the power flow between wheels, to move power to the power bus and systems interface 63 and to move power to the power bus and power sink interface 64. The outcome of these actions is to generate bi-directional roll reaction torque in response to roll-attitude or roll-damping commands or Lo produce a net zero-torque condition in which opposing roll reaction torque are balanced-out against each other as power is extracted equally from both flywheel motor-generators 70 of wheels 51 and 52.

Figure 4:
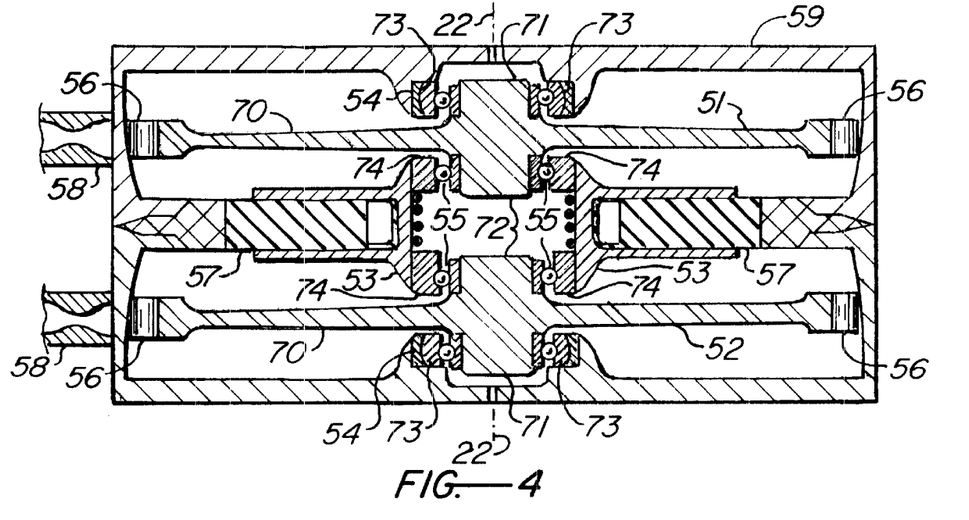
FIG. 4 is a cross-sectional view of the invention showing inertia-wheels in a neutral position.

In accordance with the present invention, FIG. 4 shows a cross-sectional view of the invention showing inertia-wheels in a neutral position. The entire flywheel assembly is mounted in enclosure 59. Wheels 51 and 52 are shaped to permit optimal energy-storage at a given rotational speed while limiting the mechanical stress seen by each wheel. Each wheel includes an integrated turbine blade set 56 and a motor-generator 70. Two gas flow nozzles 58 enable pressurized gas to impinge upon the turbine blades 56 and spin the wheels up to normal operating speed.

Two outward-pointing shafts 71 are axially arranged on and parallel to roll axis 22. These shafts are supported by bearings 54. Two inward-pointing shafts 72 are axially arranged on and parallel to roll axis 22 and are supported by bearings 55. Bearings 54 are mounted into enclosure 59 through a spherical ball-in-socket mount 73. This arrangement enables tilting of the flywheels such that each wheel rotation axis may be moved out of alignment (parallel orientation) with roll axis 22 by a small angle defined as the angle of tilt for both wheels 51 and 52. Bearings 55 are mounted into a movable support 53 through a spherical ball-and-socket mount 74. This socket arrangement enables tilting of the flywheels such that each wheel rotation axis may be moved out of alignment (parallel orientation) with roll axis 22 by a small angle defined as the angle of tilt for both wheels 51 and 52.

A two-way actuator 57 drives the tilt function that controls the pitch- and yaw-reaction torque output of the system 10. The two-way actuator 57 moves (by translation) the inner wheel bearing support 53 (which houses the inner-pointing shaft 72 bearings 55 and balling-socket bearing mount interface 74) in both the horizontal pitch axis 23 and vertical yaw axis 24 directions either independently or in combination. Thus the command-controllable actuator 57 generates an advantageous two-way translation-motion of the flywheel common mount 53 that causes both flywheels to tilt equally and in opposite directions. This action enables the autopilot to generate reaction torque in either pitch or yaw in response to guidance commands.

Figure 5:
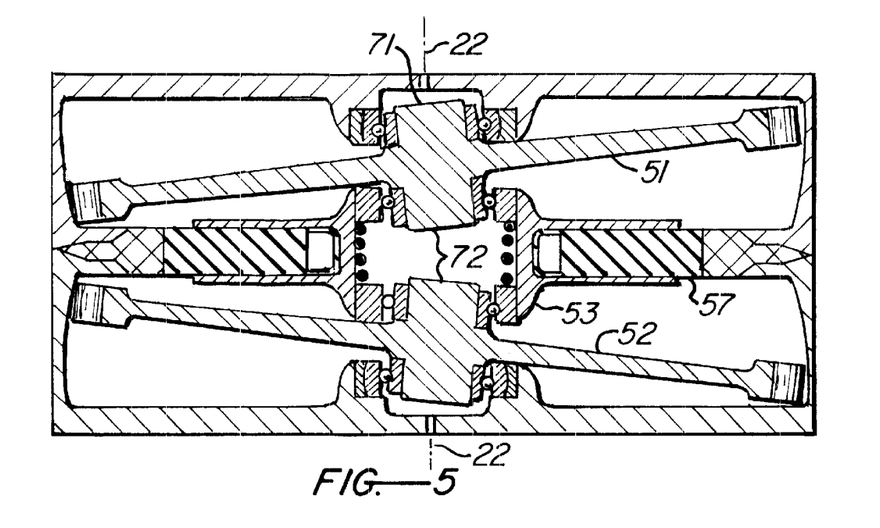
FIG. 5 is a cross-sectional view of the invention showing inertia-wheels in a tilted position.

In accordance with the present invention, FIG. 5 shows a cross-sectional view of the invention showing both inertia-wheels in a tilted position. In this view the offset imposed on the common bearing mount 53 by actuator 57 causes both flywheel shafts represented by 71 and 72 to shift the axis of rotation out of parallel-orientation with the common roll axis 22 which is the neutral position reference axis common to both flywheels 51 and 52. The angular amount of shift of each axis for each flywheel is equal and opposite such that both wheels tilt in the same amount but opposite directions. This tilting creates a precession-derived torque reaction from each wheel that twists around an axis that is mutually orthogonal to the plane in which the tilt of both wheels is defined (i.e. out of the page in this view). This feature is new to the art and represents the primary inventive matter that enables the three-axis reaction torque control system to be used to advantage over prior art.

Figure 6A:
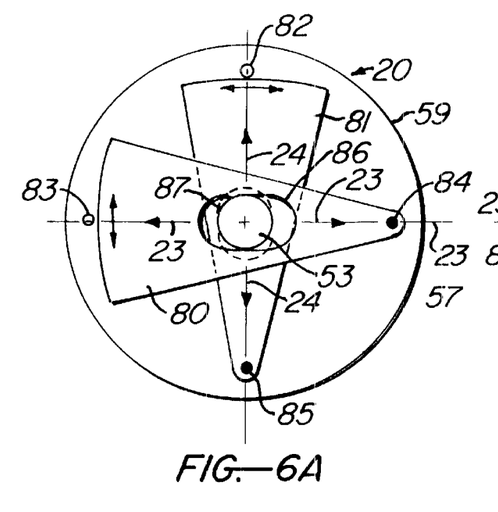
FIGS. 6A–6C shows three cross-sectional views of embodiments of mechanisms to provide a 2-way actuation means to tilt both inertia-wheels.

In accordance with the present invention, FIG. 6 shows three cross-sectional views of embodiments of mechanisms to provide a 2-way actuation means to tilt both inertia-wheels. FIG. 6a shows a dual cam plate 80,81 mechanism. Both cam plates 80,81 are able to rotate about a pivot means fixed to housing 59 shown as 85 for cam plate 81 and as 84 for cam plate 80. Cam plate 80 is rotated by actuation means 83 which consists of a pinion gear means 83 engaging gear teeth on cam plate 80 and an actuator motor means with a gear transmission means 83. This actuator 83, by rotating cam plate 80, causes flywheel mount 53 to move in the vertical direction along pitch axis 24 either upward or downward as shown by arrows 24. Mount 53 is caused to move by contact with the sides of cam plate 80 slot means 86 which forms a pushing and sliding contact with the outer housing of the floating wheel shaft mount housing 53. Cam plate 81 is rotated by actuation means 82 which consists of a pinion gear means 82 engaging gear teeth on cam plate 81 and an actuator motor means with a gear transmission means 82. This actuator 82 by rotating cam plate 81 causes flywheel mount 53 to move in the horizontal direction along yaw axis 23 sideways either left or right as shown by arrows 23. Mount 53 is caused to move by contact with the sides of cam plate 81 slot means 87 which forms a pushing and sliding contact with the outer housing of the floating wheel shaft mount housing 53. Both cam plates 80,81 can be moved independently of each other, and in combination, to move mount 53 in two directions along axis 23 or along axis 24 or along a direction that includes motion along both axis 23 and axis 24. In this manner the motion of mount 53 is effected and thereby the tilt of both flywheels is created. This tilt action in turn creates precession reaction torque in the pitch and yaw directions on airframe 20. Mount 53 is free-floating but constrained by contact with the combination of both orthogonal slots 86 and 87. The mount 53 is further constrained to slide along center-web interface means (indicated by 57 in FIGS. 4 & 5) of housing 59. This provides a combination of the three orthogonal constraining and sliding interfaces to keep mount 53 precisely positioned yet free to move is needed by actuation system 57.

Figure 6B:
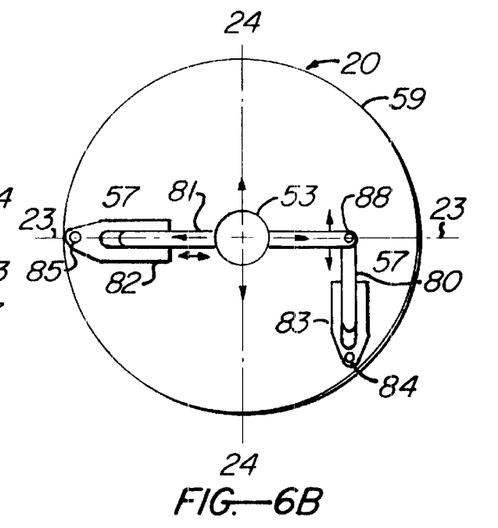

FIG. 6b shows a two-way actuation system 57 consisting of a dual link-arm mechanism designed to shift the mount 53 in the horizontal direction 23 (using link 81 and push-pull actuator 82) and the vertical direction 24 (using link 80 and push-pull actuator 83). This actuation system means 57 is functionally equivalent to the two-way actuation system 57 of FIG. 6a. The means of generating translating-motion of mount 53 consists of using a pair of push-pull actuators 82 and 83 which could consist of pneumatic cylinders, hydraulic cylinders, electric solenoids, or motor/ball-screw actuators. Each of these actuation means is suitable to perform the intended function and the system application and packaging constraints will dictate which means is best to use for meeting the overall system requirements. In this case link 81 is solidly fixed to mount 53 and firmly held by actuator 82 at one end and constrained by pivot 88 at the other end. When actuator 82 generates a push or a pull motion the coupling with link 81 is extended or contracted. Since actuator 82 is fixed to pivot at 85 the link is forced to move to the right (under extension or push motion) and to the left (under contraction or pull motion). The pivot at 88 maintains a virtually stable vertical location of the right end of link 81; thereby constraining link 81 to move along the yaw axis 23 (except for a second-order motion that forces pivot 88 to move along the circle path imposed by the radius arm consisting of link 80 and actuator 83 whose fixed pivot is located at 84.)

To create vertical motion of mount 53, link 80 is fixed to pivot 88 and firmly held by actuator 83 at the other end. When actuator 83 generates a push or a pull motion the coupling with link 80 is extended or contracted. Since actuator 83 is fixed to pivot 84 the link is forced to move upward (under extension or push motion) and downward (under contraction or pull motion). The pivot at 88 maintains a virtually stable horizontal location of the upper end of link 80 and thereby constrains link 80 to move along the pitch axis 24 (except for a second-order motion that forces pivot 88 to move along the circle path imposed by the radius arm consisting of link 81 and actuator 82 whose fixed pivot is located at 85.)

The combination of both of the actuator—link motions is sufficient to cause mount 53 to move in horizontal and vertical directions virtually independently (except for motion caused second-order effects previously described.) In this case mount 53 is constrained to move with link 81 and link 81 is constrained by attachment to actuator 82 and pivot 88. Pivot 88 is further constrained to position by the attachment to link 80 and actuator 83 to which link 80 is firmly fixed. Actuator 83 is finally constrained by attachment to pivot 84. The combination of these attachments and constraints keeps mount 53 free-floating yet positioned precisely and firmly unless either actuator 82 or actuator 83 is caused to generate a push (extension) or pull (contraction) motion. The mount 53 is further constrained to slide along the center-web interface means (indicated by 57 in FIGS. 4 & 5) of housing 59. This provides a combination of three orthogonal constraining and sliding interfaces that keep mount 53 precisely positioned yet free to move as needed by the actuation system 57.

Figure 6C:
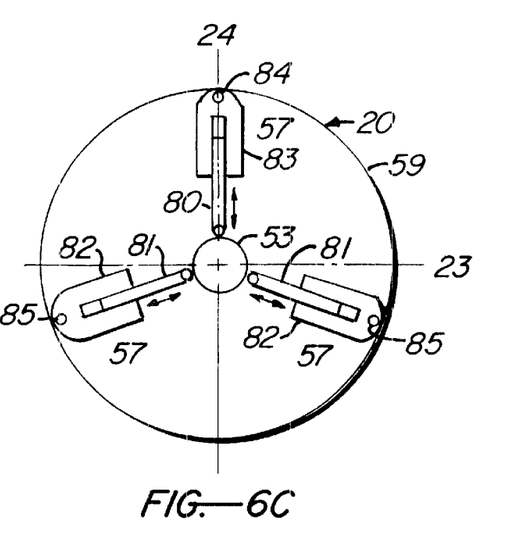

FIG. 6c shows a two-way actuation system 57 consisting of a triple link-arm mechanism designed to shift mount 53 in the horizontal direction 23 (using links 81 and push-pull actuators 82) and the vertical direction 24 (using link 80 and push-pull actuator 83). This actuation system means 57 is functionally equivalent to the two-way actuation system 57 of FIGS. 6a and 6b. The means of generating translating motion of mount 53 consists of the combination of push-pull motions of actuator 83 to produce vertical motion and actuators 82 (which work in opposition to one another) to create a net sideways or horizontal motion. In this case actuator 83 and both actuators 82 consist of pneumatic cylinders, hydraulic cylinders, electric solenoids, or electric motor/ball-screw actuators. Each of these actuation means is suitable to perform the intended function and the system application and packaging constraints will dictate which means is best to use for meeting the overall system requirements. The creation of a push-extension at actuator 83 combined with equal pull-contractions at both actuators 82 is required to move mount 53 downward along vertical axis 24. The reverse of this (pull-contraction at actuator 83 and equal push-extensions at actuators 82) is required to move mount 53 upward along axis 24. Horizontal motion of mount 53 is created by a combination of the push extension of left-side actuator 82 and pull-contraction of right-side actuator 82 (to move right) and pull-contraction of left-side actuator 82 and push-extension of right-side actuator 82 (to move left). In both of these cases actuator 83 produces minor motion as needed to keep mount 53 moving along a horizontal track. Mount 53 is connected to link 80 and links 81 by pivot-joints that allow the mount to be free-floating yet fully constrained in the pitch-yaw plane. In the lateral direction (in and out of the page) mount 53 is further constrained to slide only along the center-web interface means (indicated by 57 in FIGS. 4 & 5) of housing 59. This provides a combination of three orthogonal constraining and sliding interfaces that keep mount 53 precisely positioned yet free to move as needed by the actuation system 57. The combination of three actuators fixed at 120 degree increments around a circle is sufficient to allow the control system to generate position commands that provide for the essential 2-way motion of mount 53 needed to tilt both flywheels as needed for diverse system requirements in both pitch and yaw directions.

The combination of a set of dual flywheels with centrally-located 2-way actuated mount enables the system 10 primary mechanical elements to be arranged in a small and compact enclosure 59 that saves space yet performs a diverse set of essential functions necessary to the completion of long-uration mission requirements, including:

Precise and smooth 3-axis reaction torque control over a long duration mission.

Active 3-axis reaction torque control.

Minimal wasted space.

A large amount of energy-storage.

On-demand, rapid-response charging and high power input to energy-storage.

A large amount of electric power generation.

Repeatable, verifiable performance readiness checks.

A durable mechanical design that features long shelf life.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An integrated system for providing 3-axis attitude-control, energy-storage, and electrical power comprising:

Two counter-rotating inertia-wheels tandem mounted with rotational axis oriented on and parallel to the longitudinal-axis of an airframe means;

a horizontal and vertical translating support means centrally-located between said wheels housing a common wheel bearing mount communicating with and supporting both inward-pointing inertia-wheel shafts;

two outwardly-mounted tilt wheel bearing and suspension means, each communicating with and supporting an inertia-wheel outward-pointing shaft means;

an electric generator means integrally mounted to each inertia-wheel; and an electric load controller means connected to each electric generator means.

2. An integrated system for providing 3-axis attitude-control, energy-storage, and electrical power as claimed in claim 1 further comprising an autopilot & sensor means.

3. An integrated system for providing 3-axis attitude-control, energy-storage, and electrical power as claimed in claim 1 further comprising a turbine blade set integrally attached to each inertia-wheel means.

4. An integrated system for providing 3-axis attitude-control, energy-storage, and electrical power as claimed in claim 3 further comprising a turbine nozzle means.

5. An integrated system for providing 3-axis attitude-control, energy-storage, and electrical power as claimed in claim 4 further comprising a dual gas-generator means.

6. An integrated system for providing 3-axis attitude-control, energy-storage, and electrical power as claimed in claim 5 further comprising a gas-generator control means.

7. An integrated system for providing 3-axis attitude-control, energy-storage, and electrical power as claimed in claim 1 further comprising a package enclosure means.

8. An integrated system for providing 3-axis attitude-control, energy-storage, and electrical power as claimed in claim 7 wherein said package enclosure means consists of an alternate advantageous enclosure material means.

9. An integrated system for providing 3-axis attitude-control, energy-storage, and electrical power as claimed in claim 1 further comprising a performance check means.

10. An integrated system for providing 3-axis attitude-control, energy-storage, and electrical power as claimed in claim 9 further comprising a dual electric motor means.

11. An integrated system for providing 3-axis attitude-control, energy-storage, and electrical power as claimed in claim 9 further comprising an electric output controller means.

12. An integrated system for providing 3-axis attitude-control, energy-storage, and electrical power as claimed in claim 9 further comprising two wheel speed-sensor means.

13. An integrated system for providing 3-axis attitude-control, energy-storage, and electrical power as claimed in claim 1 further comprising a 2-way actuated-linkage means.

14. An integrated system for providing 3-axis attitude-control, energy-storage, and electrical power comprising:

Two counter-rotating inertia-wheels tandem mounted with rotational axis oriented on and parallel to the longitudinal-axis of an airframe means;

a horizontal and vertical translating support means centrally-located between said wheels housing a common wheel bearing mount communicating with and supporting both inside inertia-wheel shafts;

two outwardly-mounted tilt-wheel bearing and suspension means, each communicating with and supporting an inertia-wheel outer shaft means;

an electric generator means integrally mounted to each inertia-wheel; and an electric load controller means connected to each electric generator means.

15. An integrated system for providing 3-axis attitude-control, energy-storage, and electrical power as claimed in claim 14 wherein said inertia-wheels comprise a shape optimized to improve performance.

16. An integrated system for providing 3-axis attitude-control, energy-storage, and electrical power as claimed in claim 14 herein said inertia-wheels comprise a material optimized to improve performance.

17. An integrated system for providing 3-axis attitude-control, energy-storage, and electrical power as claimed in claim 14 further comprising a multiple turbine blade set means.

18. An integrated system for providing 3-axis attitude-control, energy-storage, and electrical power as claimed in claim 14 further comprising a multiple turbine nozzle means.

19. An integrated system for providing 3-axis attitude-control, energy-storage, and electrical power as claimed in claim 14 further comprising a 2-way actuated-linkage means.

* * * * *